United States Patent Office 3,562,017
Patented Feb. 9, 1971

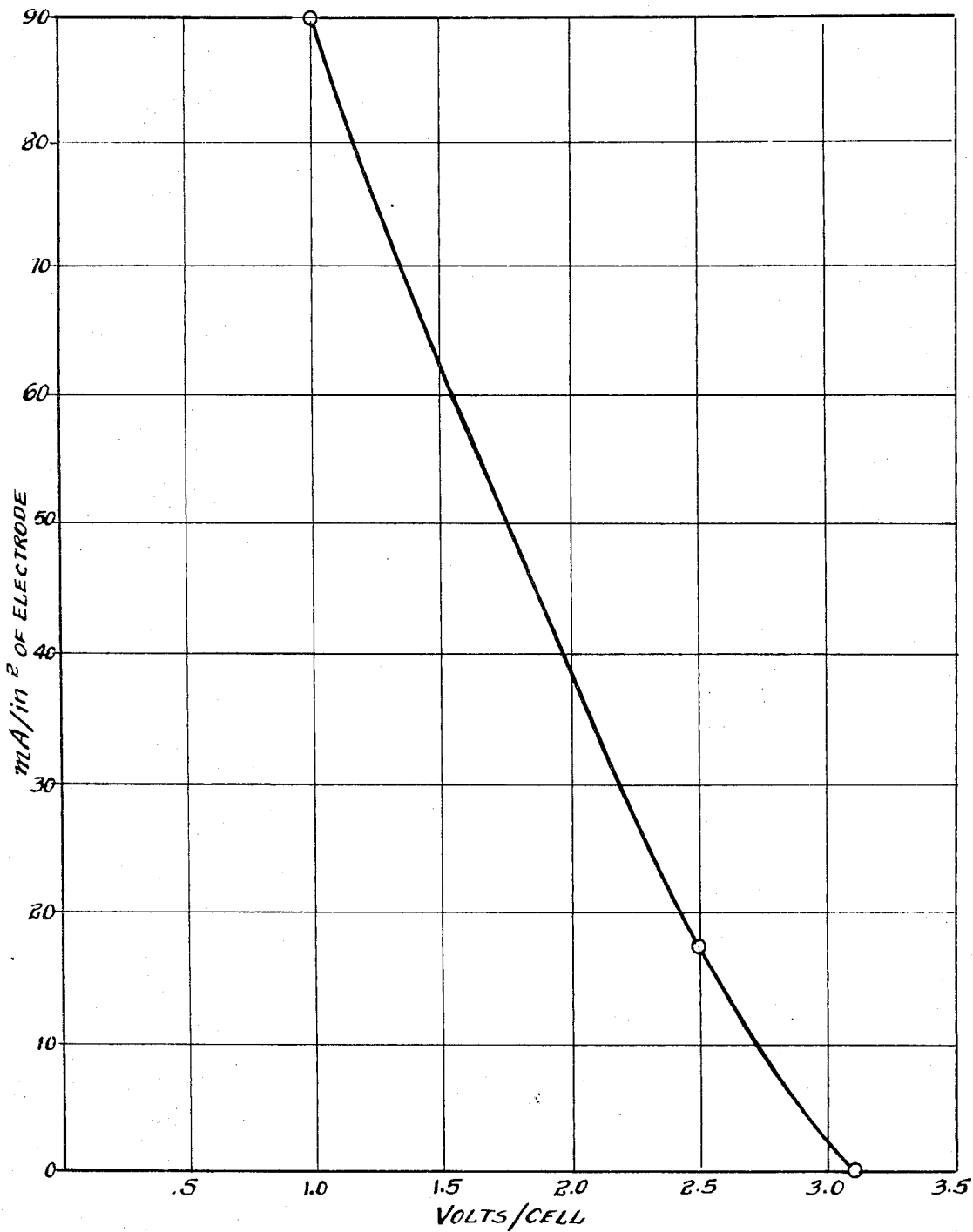
VOLTAGE Vs CURRENT DENSITY

3,562,017
NON-AQUEOUS ELECTROLYTES AND ELECTRO-
CHEMICAL BATTERIES CONTAINING THE SAME
Arthur E. Lyall, Bridgewater, N.J., assignor to Gulton
Industries, Inc., Metuchen, N.J., a corporation of New
Jersey
Filed Sept. 22, 1967, Ser. No. 669,803
Int. Cl. H01m 15/06, 43/06
U.S. Cl. 136—6
10 Claims

ABSTRACT OF THE DISCLOSURE

Non-aqueous electrolytes, having particular utility for use in lithium-nickel halide batteries, comprising solutions, in an organic solvent selected from the group propylene carbonate, gamma, butyrolactone, N-methyl-2-pyrrolidone and sulfoxides which are liquid at room temperature, notably dimethylsulfoxide, of a solute comprising a salt of hexafluorophosphate, together with a depolarizing agent, especially lithium levulinate; and rechargeable lithium-nickel halide batteries containing said electrolytes.

---

This invention is directed to novel non-aqueous electrolytes and to rechargeable lithium-nickel halide battery cells, particularly lithium-nickel fluoride battery cells, containing said electrolytes.

Lithium-nickel halide battery cells utilize, as the cell components thereof, a lithium (negative) electrode, a nickel halide (positive) electrode, and a non-aqueous electrolyte which includes a solvent, a solute to conduct current and to supply ions for the reactions, and, desirably, a depolarizer for the nickel halide electrode. Such battery cells have particular value in environments, such as for space and terrestrial usages, where high watt-hour-per pound ratios are an important desideratum. Electrolytes of the non-aqueous type, which have been suggested for use in such battery cells, have been found to have one or more of a number of significant disadvantages such as, for instance, the presence of an active hydrogen in the organic solvent portion of the electrolyte composition, poor electrical conductivity in said organic solvent, and unsatisfactory characteristics with reference to viscosity, boiling point and freezing point of the organic solvent.

In accordance with the present invention, markedly improved non-aqueous electrolytes have been evolved for use in lithium-nickel halide battery cells which, in turn, bring about substantial improvements in the operation of such cells. The non-aqueous electrolytes of the present invention utilize, as the organic solvent, certain organic liquids, described hereafter, which maintain their liquid state over a wide temperature range, from below normal room temperature to above 60° C., they are polar compounds which are free of active hydrogens or hydroxyl groups, and which desirably possess a dielectric constant greater than 38. Where, however, the solubility of the solutes, described below, is great enough in the organic solvent, the effect of the dieelectric constant is diminished and, therefore, the advantages of using the same come into play to a somewhat lesser extent. It is desirable, but not imperative, that the organic solvents have a viscosity at room temperature less than 3 cps.

The organic solvents which have been found to be highly advantageous for use in the production of the electrolytes of the present invention are propylene carbonate, N-methyl-2- pyrrolidone, and sulfoxides which are liquid at room temperatures, notably dimethylsulfoxide.

It is desirable that the negative ion be the same as the electroactive species of the cell, although this is not essential since some highly conductive solutes completely differ from the electroactive species and can be used as supporting electrolytes in which case another salt containing the electroactive species is also added but in relatively small amounts. Thus, a salt of hexafluorophosphoric acid is used as the electrolyte solute where the positive electrode in its charged state is nickel fluoride. When the positive eelectrode is nickel chloride, the electrolyte solute most advantageously comprises a salt of hexafluorophosphate or a supporting electrolyte and a quantity of lithium chloride. Illustrative examples of the hexafluorophosphate salts are the alkali metal salts such as lithium, sodium-, potassium and rubidium salts, which can be represented by the formula $MPF_6$ where M is an alpali metal; and the tertiary amine or quaternary ammonium salts of hexafluorophosphate such as phenyltrimethylammonium hexafluorophosphate $[C_6H_5N(CH_3)_3.PF_6]$, tetramethylammonium hexafluorophosphate $[(CH_3)_4N.PF_6]$, tetraethylammonium hexafluorophosphate $[(C_2H_5)_4N.PF_6]$, triethylamine hexafluorophosphate $[(C_2H_5)_3N.PF_6]$, and other tertiary amine salts of hexafluorophosphoric acid wherein the tertiary amine is, for example, triisopropylamine, tributylamine, pyridine, or N-methyl pyridine. The foregoing solutes are characterized by adequate solubility in the above-disclosed organic solvents, by ionizing in said solvents, and by compatibility with the solvent and also with the anode and the cathode of the battery.

The depolarizing agent is added in small quantities to reduce the cathode overpotential of the nickel halide electrode during either charge or discharge. An especially useful depolarizing agent for this purpose is lithium levulinate $[CH_3CO(CH_2)_2COOLi]$. Other depolarizing agents can be used as, for example, tertiary amines such as triethylamine, tri-isopropylamine, tributylamine, pyridine and N-methyl pyridine. The polarization involved at the nickel halide electrode in the batteries to which the present invention relates particularly concerns activation and concentration polarization. Thus, in a battery cell of the lithium-nickel fluoride electrode type, concentration polarization occurs during charging of the cell due to what is believed to be a complexing of the nickel fluoride with fluorine which prevents some of the nickel from being converted to nickel fluoride. The activation polarization occurring during discharging is believed to be caused by the complexing of the nickel fluoride with fluorine which prevents complete discharging of the nickel fluoride to nickel.

The most advantageous form of the electrolytes for use in lithium-nickel halide battery systems comprises potassium hexafluorophosphate as the solute, propylene carbonate or dimethylsulfoxide as the solvent, and lithium levulinate as the depolarizing agent. Potassium hexafluorophosphate is an especially good solute in the electrolyte because it results in a very low selfdischarge of the battery so the battery has a good shelf life. When the positive electrode is nickel fluoride, the solvent is most advantageously propylene carbonate or dimethyl sulfoxide. Where the positive electrode, however, is nickel chloride, dimethylsulfoxide should not be used as the electrolyte solvent because it dissolves nickel chloride. When propylene carbonate solutions of potassium hexafluorophosphate or other hexafluorophosphates are used in a lithium-nickel chloride battery system, as above indicated, the potassium hexafluorophosphate is a supporting electrolyte and a small quantity of lithium chloride should be added to the electrolyte solution.

The concentration of the solute in the organic solvent is variable. Thus for example, in the case of propylene carbonate as the solvent and potassium hexafluorophosphate as the solute, the potassium hexafluorophosphate may comprise from about 60 to about 100 g./L; in the case of dimethylsulfoxide as the solvent and potassium hexafluorophosphate as the solute, the potassium hexafluorophosphate may comprise from about 140 to about 240 g./L; and in the case of the propylene carbonate as the solvent and phenyltrimethylammonium hexafluorophosphate as the solute, said solute may comprise from 300 to 600 g./L.

As indicated above, the non-aqueous electrolytes of the present invention are especially useful in lithium-nickel halide battery cells. In this connection they possess the advantage of being compatible with lithium and with such cathode materials as are used in conjunction with the lithium anode in the sense that there is essential freedom from corrosion or spontaneous reaction between the electrolyte and the cell components. They also possess the advantage that the conductivity of the electrolyte is sufficient that the internal voltage drop does not prevent the cell from being discharged at usable rates. Generally speaking, for most practical purposes, the conductivity of the electrolyte should be greater than $10^{-3}$ mhos-cm.$^{-1}$.

The following examples are illustrative of electrolytes which are useful in lithium-nickel fluoride cells. It will be understood that many other electrolytes can readily be be prepared in the light of the guiding principles and teachings disclosed herein. All parts given are by weight. The propylene carbonate and the dimethylsulfoxide utilized contained less than 500 p.p.m. of water.

EXAMPLE 1

Propylene carbonate solution containing 90 g. per liter of potassium hexafluorophosphate, and lithium levulinate (q.s. saturation). Specific conductance=6.8 mhos. Viscosity=3.73 cps.

EXAMPLE 2

Dimethylsulfoxide solution containing 90 g. per liter of potassium hexafluorophosphate, and lithium levulinate (q.s. saturation). Specific conductance=10.5 mmhos. Viscosity=4.11 cps.

EXAMPLE 3

Propylene carbonate solution containing 90 g. per liter of potassium hexafluorophosphate, and tetramethylammonium fluoride ($<1.0$ g./l.) Specific conductance=6.8 mmhos. Viscosity=3.73 cps.

EXAMPLE 4

Dimethylsulfoxide solution containing 190 g. per liter of potassium hexafluorophosphate, and tetramethylammonium fluoride ($<1.0$ g./l.). Specific conductance=10.5 mmhos. Viscosity=4.11 cps.

EXAMPLE 5

Propylene carbonate solution containing 506 g. per liter of phenyltrimethylammonium hexafluorophosphate, Specific conductance=7.44 mmhos. Viscosity=9.53 cps.

The electrolytes of the present invention can be used in batteries in which the negative electrodes comprise lithium foil supported on a grid-like carrier structure, and in which the positive electrodes utilize nickel chloride or nickel fluoride. However, they are more advantageously used as the electrolytes in batteries in which the lithium electrode comprises a reinforcing grid support upon which there is supported a compacted comminuted mixture containing, as essential ingredients, active powdered lithium metal and particles of permanently conductive material, such as degassed granular carbon is essentially oxygen-free nickel powder in extensive intimate electrical contact with the lithium particles, the lithium particles and the particles of conductive material being held together and to the grid by a minor proportion of an inert binder such as polyethylene or carboxymethylcellulose distributed throughout the mixture. Such lithium electrodes are more particularly disclosed and claimed in the joint application of Harvey N. Seiger and Arthur E. Lyall entitled Negative Lithium Electrode and Electrochemical Battery Containing the Same, Ser. No. 669,802 filed on even date herewith and now Pat. No. 3,508,967.

The positive and negative electrodes are, of course, separated from each other by separator members in accordance with conventional practice. The separators, which may, for example, be untreated cotton percale or non-woven polypropylene or Teflon-Fiberglas paper, serve mechanically to separate the positive and negative electrodes from each other and, in addition, act as a reservoir for the electrolyte.

A battery cell, illustrative of one showing the utility of a typical electrolyte made in accordance with the present invention, is described in the following example. All stated percentages are by weight.

EXAMPLE 6

A cell made with an electrolyte of propylene carbonate containing 90 g./l. of potassium hexafluorophosphate and saturated with lithium levulinate. The positive electrodes were nickel fluoride (as a paste of 67.5% nickel fluoride, 22.5% carbon black, and 10% polyethylene binder) on a Monel 400 expanded metal substrate. The negative electrodes were lithium (as a paste of 52% lithium, 38% carbonyl nickel powder, and 10% carboxymethylcellulose binder). The separator was a non-woven polypropylene felt having a thickness of 6 to 8 mils and a density of 67 g./m.$^2$. This cell was pulse discharged for 1 second pulses and the current and voltage recorded. A graph of current density versus voltage is shown in the accompanying drawing.

It should be understood that numerous modifications may be made in the examples described above without deviating from the broader aspects thereof.

I claim:
1. A non-aqueous electrolyte, having particular utility for use in lithium-nickel halide batteries, comprising a solution, in an organic solvent selected from the group propylene carbonate, gamma butyrolactone, N-methyl-2 pyrrolidone and sulfoxides which are liquid at room temperature, of a solute comprising a salt of a hexafluorophosphate and lithium levulinate as a depolarizing agent.

2. An electrolyte according to claim 1, in which the hexafluorophosphate salt is potassium hexafluorophosphate and the organic solvent is dimethyl sulfoxide, the potassium hexafluorophosphate being present in a concentration of about 140 to about 240 g./l. in the dimethylsulfoxide.

3. An electrolyte according to claim 1, wherein the sulfoxide is dimethylsulfoxide.

4. An electrolyte according to claim 1, wherein the solute is an alkali metal hexafluorophosphate.

5. An electrolyte according to claim 1, wherein the solute is potassium hexafluorophosphate.

6. An electrolyte according to claim 1, wherein the organic solvent is propylene carbonate and the solute is potassium hexafluorophosphate.

7. An electrolyte according to claim 1, wherein the organic solvent is propylene carbonate and the solute is selected from the group phenyltrimethylammonium hexafluorophosphate, tetramethylammonium hexafluorophosphate and tetraethylammonium hexafluorophosphate.

8. An electrolyte according to claim 6, in which the potassium hexafluorophosphate is present in a concentration of about 60 to about 100 g./l. in the propylene carbonate.

9. A rechargeable battery comprising at least one lithium negative electrode and at least one nickel halide positive electrode, immersed in a non-aqueous electrolyte according to claim 1.

10. A rechargeable battery according to claim 9, in which the positive electrode is nickel fluoride, and in which the electrolyte is that of claim 6.

(References on following page)

References Cited

UNITED STATES PATENTS

| | | | |
|---|---|---|---|
| 3,423,242 | 1/1969 | Meyers | 136—154X |
| 3,393,092 | 7/1968 | Shaw et al. | 136—155X |
| 3,413,154 | 11/1968 | Rao | 136—153X |
| 3,415,687 | 12/1968 | Methlie | 136—155X |

FOREIGN PATENTS

| | | | |
|---|---|---|---|
| 910,930 | 11/1962 | Great Britain | 136—100 |

OTHER REFERENCES

Hill et al., Research and Development of a High Capacity, Nonaqueous Secondary Battery, pp. 1, 2, 76, and 77, published August 1965, Contract No. NAS 3-2780 for NASA, copy in group 110.

DONALD L. WALTON, Primary Examiner

U.S. Cl. X.R.

136—137, 154